United States Patent [19]

Khodos

[11] 4,265,360

[45] May 5, 1981

[54] ARTICLE TRANSFER ARRANGEMENT

[75] Inventor: Yulian Khodos, Overland Park, Kans.

[73] Assignee: Mid-West Conveyor Co., Inc., Kansas City, Kans.

[21] Appl. No.: 32,121

[22] Filed: Apr. 23, 1979

[51] Int. Cl.³ ............... B65G 25/02; B65G 17/48
[52] U.S. Cl. ............... 198/774; 198/488; 198/614; 198/802
[58] Field of Search ............ 198/485, 487, 488, 614, 198/732, 740, 746, 748, 750, 774, 796, 802

[56] References Cited

U.S. PATENT DOCUMENTS

| 321,345 | 6/1885 | Cusson | 198/748 X |
|---|---|---|---|
| 1,461,638 | 7/1923 | Wells et al. | |
| 3,198,309 | 8/1965 | Ogawa | |
| 3,712,452 | 1/1973 | Takahashi | 198/487 X |
| 3,746,148 | 7/1973 | Hilger et al. | 198/488 X |
| 4,044,886 | 8/1977 | Sender | 198/488 |

*Primary Examiner*—Jeffrey V. Nase
*Attorney, Agent, or Firm*—Fishburn, Gold and Litman

[57] ABSTRACT

An article transfer arrangement includes a loading station and a discharge station spaced therefrom and level therewith, upper and lower pairs of parallel track rails extending between the stations, a rigid article carrier having an upper article engaging surface and front and rear wheels, the front wheels being closer to the article engaging carrier surface than the rear wheels, and an endless drive chain connected to the carrier and to a drive motor and operable to reciprocate the carrier between the stations. During motion between the loading station and the discharge station, the front wheels are lifted into engagement with the upper track rails by action of the drive chain about a chain sprocket whereby the carrier surface is oriented horizontally and is raised above the platform level of the station to thereby lift an article from the loading station. At the discharge station, the front wheels are lowered in a similar manner from the upper track thereby lowering the carrier surface out of contact with the article and depositing same at the discharge station. The carrier is returned to the loading station with the carrier surface lowered, thereby clearing the carrier beneath an article at the loading station awaiting transfer.

16 Claims, 9 Drawing Figures

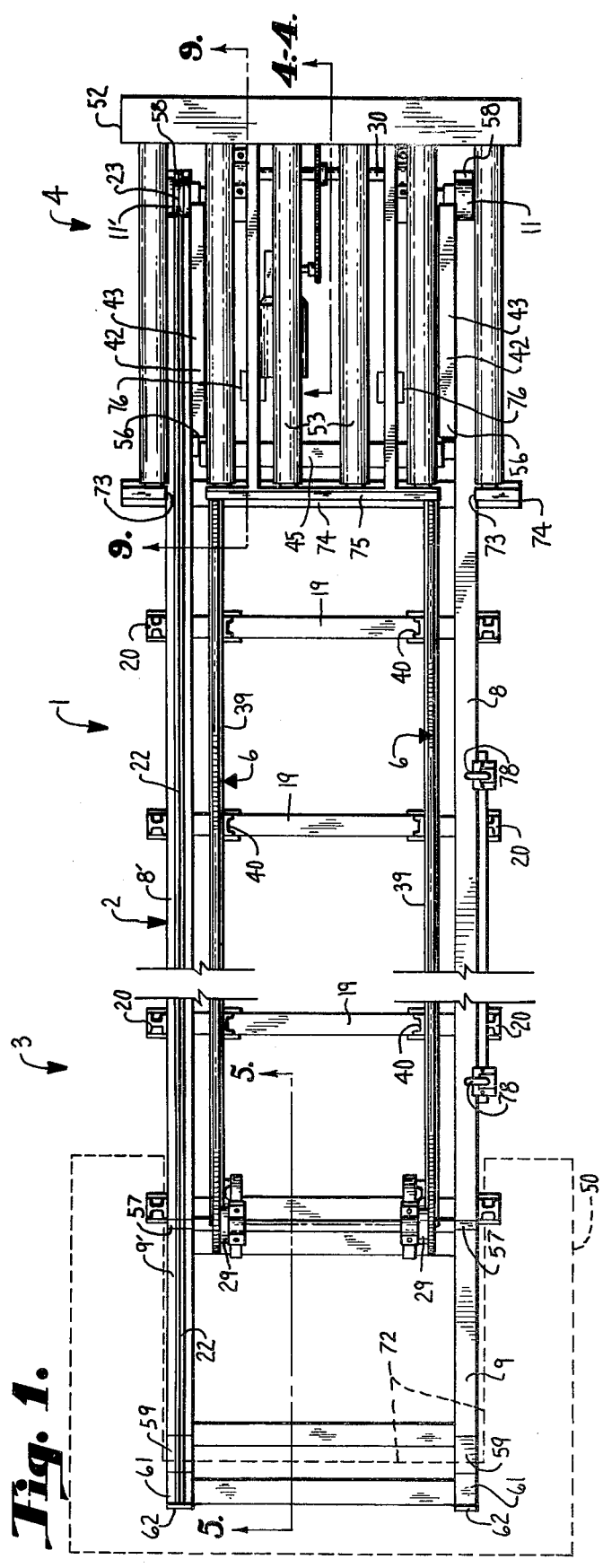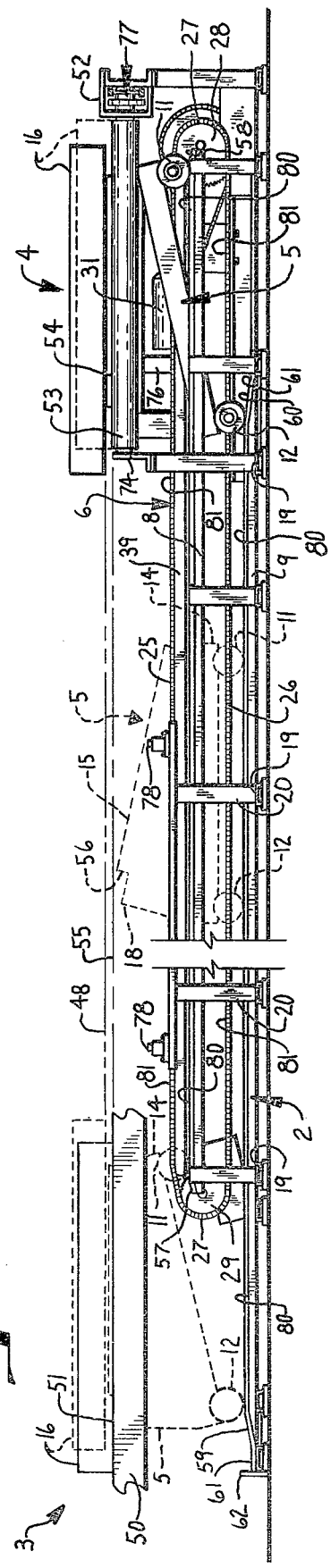

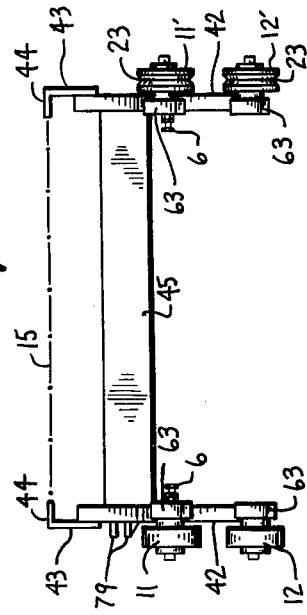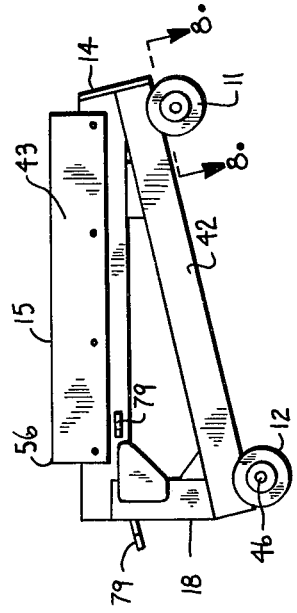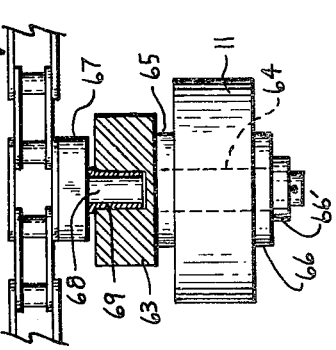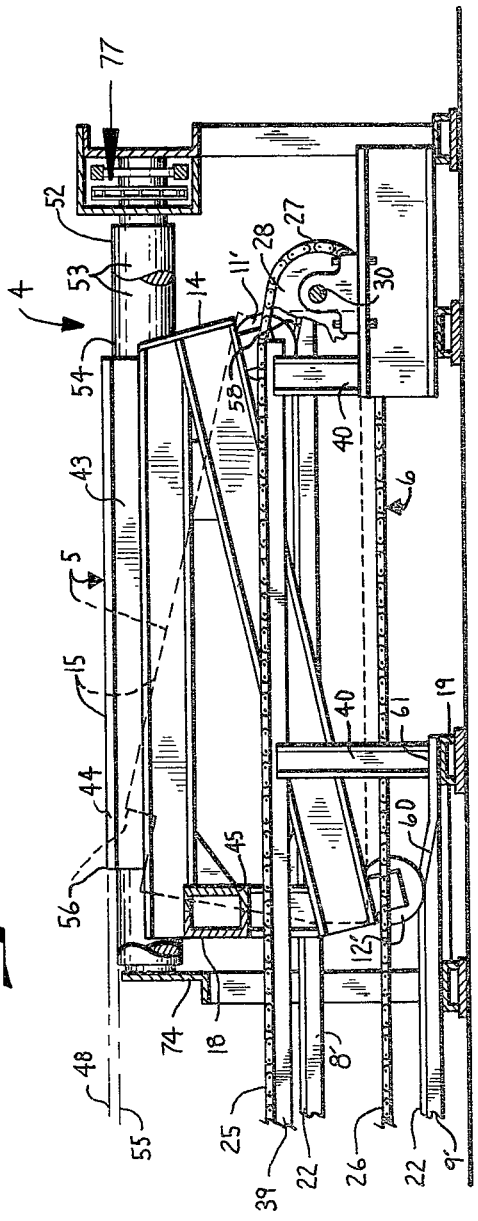

ARTICLE TRANSFER ARRANGEMENT

FIELD OF THE INVENTION

The present invention relates to article transfer arrangements and, more particularly, to such an arrangement including an article carrier having one end supported at constant elevation and the other end alternately lifted and lowered by a looped drive chain for respective transfer and return of the carrier between a loading and discharge station.

BACKGROUND OF THE INVENTION

In apparatus for conveying large individual articles, such as heavily loaded pallets, between a receiving station and a discharge station, means are usually provided for lifting a portion of a mobile carrier into engagement with the pallet, for lowering the carrier portion out of engagement with the pallet at the discharge station, and for maintaining the lowered status of the returning carrier for clearance beneath an awaiting pallet at the loading station. Such lifting means which have been heretofore employed include: hydraulic cylinders necessitating the connection of hydraulic hoses to the moving carrier; complex rotary cam arrangements actuated by a drive chain; or linear cam and detent arrangements. In one prior device for transferring articles from a first elevation to the second elevation, a carrier is driven about a complete loop, engaging an article on one side of the loop and returning in an inverted fashion on the other side. Such an arrangement requires considerable space for clearance of the returning carrier.

SUMMARY OF THE INVENTION

The article transfer arrangement of the present invention includes an article carrier which, while reciprocated between the loading and discharge station, does not utilize complex hydraulic or cam arrangements for article engagement, and requires a minimum of space for operation. This is accomplished by providing upper and lower tracks and a carrier with wheels at one end closer an article engaging surface than wheels at the other end.

The principal objects of the present invention are: to provide an improved arrangement for transferring an article from a loading platform to a conveyor; to provide such an arrangement which includes upper and lower tracks extending between the loading and discharge stations and an endless drive chain loop having upper and lower runs spaced respectively from the upper and lower tracks; to provide such an arrangement having an article carrier which includes wheels engaging the tracks, and is connected to the chain for reciprocation between the loading and discharge stations; to provide such a carrier wherein the wheels at one end are spaced closer to an article engaging surface than the wheels at the other end and the chain is connected adjacent said one end whereby that end is raised up and onto the upper tracks, thereby lifting the article engaging surface into engagement with an article at the loading platform; to provide such a structure whereby said one end wheels are lowered from the upper track thereby lowering the carrier surface out of engagement with the article at the discharge station; to provide such an arrangement which is simple in design and construction and requires less operating space than many previous article transfer devices; and to provide such an arrangement which is economical to manufacture, durable and reliable in operation, and is particularly well adapted for its intended purpose.

Other objects and advantages of this invention will become apparent from the following description taken in connection with the accompanying drawings wherein are set forth, by way of illustration and example, certain embodiments of this invention.

The drawings constitute a part of this specification, include an exemplary embodiment of the present invention, and illustrate various objects and features of the article transfer arrangement.

BRIEF DESCRIPTION OF THE DRAWINGS

FIG. 1 is a top plan view of the article transfer arrangement of the present invention.

FIG. 2 is a side elevational view of the article transfer arrangement with the article carrier shown in phantom lines at various positions along the track.

FIG. 6 is a side elevational view of the article carrier and illustrates structural details thereof.

FIG. 7 is a front elevational view of the article carrier.

FIG. 8 is a greatly enlarged fragmentary sectional view taken along line 8—8 of FIG. 6 and illustrates connection of the drive chain to the article carrier.

FIG. 9 is a view similar to FIG. 5, is taken along line 9—9 of FIG. 1, and illustrates the article carrier at the discharge station.

DETAILED DESCRIPTION OF THE PREFERRED EMBODIMENTS

Figure 4:
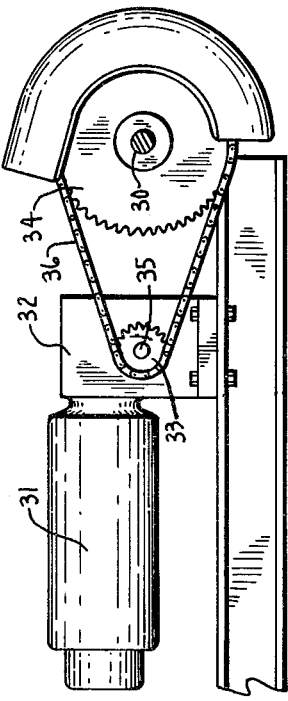
FIG. 4 is an enlarged fragmentary longitudinal sectional view taken along line 4—4 of FIG. 1 and shows further details of the drive motor.

Referring to the drawings in more detail:

The reference numeral 1 generally designates an article transfer arrangement including a track structure 2 extending between a loading station 3 and a discharge station 4, an article carrier or transfer car 5 supported on the track 2, and an endless drive member or chain 6 connected to the carrier 5 and operable to translate same between the stations 3 and 4. The track structure 2 includes upper and lower track members respectively designated 8 and 9, and the carrier 5 includes front and rear wheels 11 and 12 respectively. During movement of the carrier from the loading station 3 to the discharge station 4, a front end 14 of the carrier 5 is lifted by the chain 6 such that the front wheels 11 are brought into engagement with the upper track 8 thereby raising and bringing an upper article engaging surface 15 of the carrier 5 into supporting contact with an article 16 to be transferred. For return of the carrier 5 from the discharge station 4 to the loading station 3, the front wheels 11 are lowered and may be brought into contact with the lower track 9, thereby disengaging the carrier surface 15 from the article 16 at the discharge station 4 and clearing all parts of the carrier 5 beneath another article 16 awaiting pickup at the loading station 3.

Figure 3:
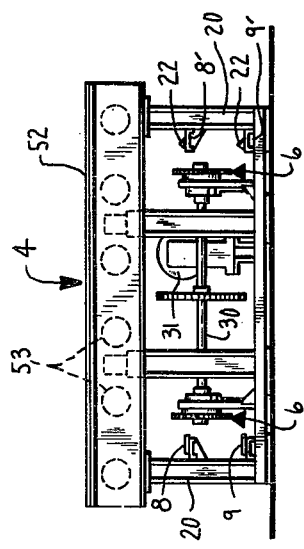
FIG. 3 is an end view of the article transfer arrangement and illustrates details of the drive motor and chain therefor.

The track structure 2 may be any suitable arrangement for supporting and guiding the carrier 5 during motion between the station 3 and 4. It is anticipated that the article 16 may comprise heavily loaded pallets; therefore, it is preferred that both the front and rear ends, 14 and 18 respectively, be supported at all times during load bearing. In the illustrated article transfer arrangement 1, the track structure 2 includes a pair of laterally spaced parallel track rails 9 and 9' having cross ties 19 attached thereto at longitudinal spacings to thereby evenly distribute the load born by a surface supporting the lower track members. The upper track members 8 and 8' are supported immediately above the lower track members, respectively 9 and 9', by longitudinally spaced vertical members 20 having lower ends thereof supported by outward extensions of the cross ties 19. The upper track members 8 and 8' are offset longitudinally (see FIG. 2) with respect to the lower track members 9 and 9' in the direction of the discharge station 4. Preferably the track rails on one side of the track structure 2 include some means for maintaining the lateral position of the carrier 5. In the illustrated arrangement 1 (FIGS. 1 and 3), the upper and lower track members 8' and 9' include an upwardly pointing triangular guide bead 22 extending longitudinally therealong for cooperation with circumferential triangular grooves 23 formed in the front and rear wheels, respectively 11' and 12', of an associated side of the carrier 5 (see FIG. 7).

In the illustrated embodiment, the endless drive member includes a pair of laterally spaced endless chains 6 arranged in loops extending between the stations 3 and 4 (FIG. 1). Each chain 6 includes an upper run 25, a lower run 26 spaced therebelow, and a pair of end turns or sprocket contact segments 27 engaged respectively with a drive sprocket 28 at the discharge station 4 and an idler sprocket 29 at the loading station 3. The drive sprockets 28 are mounted on a drive shaft 30 which may be connected by any suitable means to a driving motor 31. As illustrated in FIG. 4, the drive motor 31 is connected to a gear reduction unit 32, and further speed reduction may be accomplished by means of a pair of speed reducing sprockets 33 and 34, the sprocket 33 being mounted on a shaft 35 extending from the gear reduction unit 32 and the sprocket 34 being mounted on the drive shaft 30. The sprockets 33 and 34 are interconnected by means of a power chain 36.

In order to prevent the upper run 25 of the chain 6 from sagging at intermediate portions thereof, an elongated chain support member 39 is provided. The chain support member 39 is maintained in position by a plurality of longitudinally spaced struts 40 upstanding from the cross ties 19 and has the upper run 25 of the chain in sliding contact therewith. The lower run 26 of each chain may also be supported in a similar manner; however, since the carrier 5 is not intended to be loaded when the front wheels 11 and 11' are in contact with the lower track members 9 and 9', a chain support member for the lower run 26 is not provided in the embodiment illustrated.

With reference to FIGS. 1, 6, and 7, the article carrier 5 is U-shaped as viewed from above and includes substantially rigid side frames 42 connected by a rear cross member 45. The side frames include upper angles 43 having horizontally oriented flanges 44 defining the upper article engaging surface 15. The side frames 42 are triangular or trapezoidal in profile such that the front wheels 11 and 11' are closer to the carrier surface 15 than are the rear wheels 12 and 12'. During translation in both directions between the loading station 3 and the discharge station 4, the rear wheels 12 and 12' are preferably but not necessarily at a constant elevation by virtue of engagement with the horizontal lower tracks 9 and 9'. When the elevation of the front wheels 11 and 11' is changed, the carrier 5 is tilted about a tilting axis 46 which coincides approximately with the axis of rotation of the rear wheels 12 and 12'.

When the front wheels 11 and 11' are on the upper track 8 and 8' (as in FIG. 5), the carrier surface 15 is oriented horizontally and is at its maximum desired elevation, represented by line 48. In the article transfer arrangement 1 of the example illustrated, the upper members 43 of the carrier 5 are disposed entirely on one side (to the right in FIG. 5) of a plane, represented by line 47, passing through and including the tilting axis 46 and oriented perpendicular to an extension of the carrier surface 15. Therefore, whenever the front wheels are lowered from the upper tracks, thereby tilting the carrier 5, all points of the upper flanges 44, and therefore of the carrier surface 15, are dropped below the elevation of line 48.

As illustrated in FIG. 2, the loading station 3 is constructed from members arranged in a platform 50 and defining an upper support surface 51; and the discharge station 4 comprises a conveyor 52 including rollers 53 forming a conveyor bed 54 for support of an article 16 thereon. For the purposes of explanation, the support surface 51 and the conveyor bed 54 will be considered to be substantially coplanar and to define a platform level 55. At the loading station 3, when the front wheels 11 and 11' are brought from the lower run 26 around the end turns 27 to the upper run 25, the carrier surface 15 is raised above the platform level 55, thereby contacting and engaging the article 16 resting on the platform 50. Similarly, at the discharge station 4, as the front wheels are brought from the upper run 25 around the end turns 27 engaging the sprockets 28 to the lower run 26, the carrier surface 15 is lowered, whereby the article 16 is deposited onto the conveyor rollers 53. As the carrier 5 is returned to the loading station 3 with both the front and rear wheels engaging the lower track 9, the uppermost points of the carrier 5, that is, the rear edges 56 of the upper members 43 thereof, are disposed below the platform level 55, whereby the carrier 5 is cleared beneath an article 16 resting on the platform 50 awaiting transfer.

Figure 5:
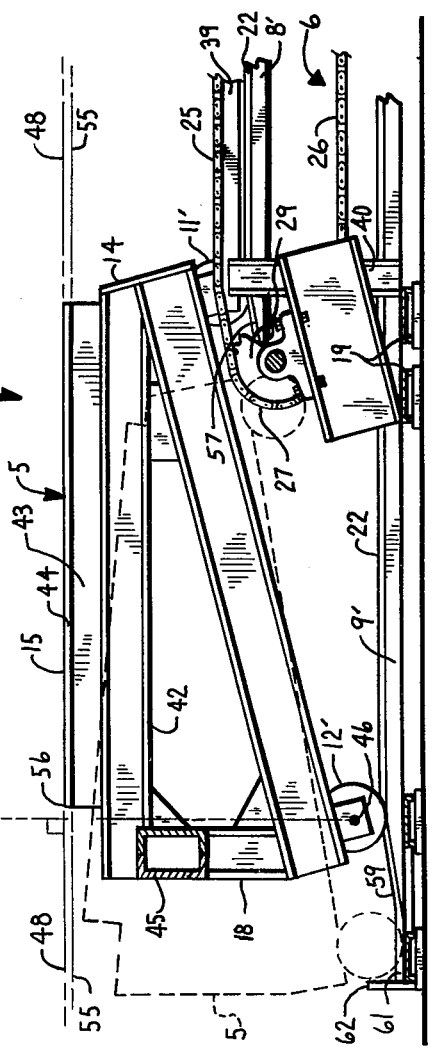
FIG. 5 is an enlarged fragmentary longitudinal sectional view taken along line 5—5 of FIG. 1 and illustrates the article carrier in an article engaging and transferring orientation at the loading station and, in phantom lines, illustrates the carrier just prior to article engagement.

The track structure 2 is provided with leveling means to orient the carrier surface 15 horizontally during engagement with and disengagement from the article 16 to prevent tilting thereof and possible scattering of the contents thereon. As illustrated in FIGS. 2, 5, and 9, the upper track members 8 and 8' include ramps 57 and 58 at opposite ends thereof, and the lower track members 9 and 9' include ramps 59 and 60 at opposite ends thereof. As the carrier 5 approaches the loading station 3 (in a leftward direction as viewed in FIG. 5), the rear wheels 12 and 12' ride down the ramps 59 of the lower tracks 9 and 9'. The chains 6 bring the front wheels 11 and 11' around the sprockets 29 and up toward the upper track members 8 and 8', thereby tilting the carrier surface 15 toward horizontal. As the carrier surface becomes horizontal, the front wheels engage the ramps 57, and the rear wheels move up the ramps 59. The ramps 57 and 59 are oriented at the same angle with respect to the track members, have the same interspacing as the interspacing between the front and rear wheels, and are spatially related to the end turn 27 such that the carrier surface 15 remains horizontal as the wheels move up the ramps and as contact is made with the article 16. At the discharge station 4, the ramps 58 and 60 respectively on the upper and lower track members effect a similar action as disengagement of the carrier surface 15 from the article 16 occurs. The ends of the lower tracks 9 and 9' are provided with lowered portions 61 which the rear wheels engage during the change of direction of the carrier 5 and stops 62 are provided at the loading end of the lower tracks 9 and 9' to prevent the carrier 5 from rolling off same.

As illustrated in FIG. 1, the drive chains 6 are disposed inboard of the members of the track structure 2. With reference to FIGS. 7 and 8, each of the side frames 42 of the carrier 5 includes block members 63 depending therefrom. Each of the wheels 11, 11', 12, and 12' is mounted on the carrier 5 by being journaled onto a respective block 63. Each of the blocks 63 includes a spindle 64 projecting outwardly therefrom to receiver a spacer 65, one of the wheels, for example wheel 11 (FIG. 8), and a bearing washer 66 which may be held onto the spindle 64 as by a retaining washer 66' and a pin pressed through the spindle 64. The block 63 adjacent the front end 14 of the carrier 5 provides a connection for the chain members 6 to the carrier 5. Each of the chain members 6 includes a dog member 67 having an outwardly projecting cylindrical lug 68 thereof. The lug 68 is received in an aperture suitably formed in the block 63 for rotation therein. The lug 68 may be received in a bearing 69 to facilitate rotation thereof.

Both the loading platform 51 and the discharge conveyor 52 are structured in such a way as to receive the article carrier 5 therewithin. As illustrated in FIG. 1, the loading platform 50 may include an open bay 72 and is adapted to support the article 16 while at the same time allowing clearance of the article carrier 5 to approach the platform 50 and engage the article 16. In a similar manner, the conveyor 52 includes cutouts 73 in one of side members 74 of the conveyor 52 to allow clearance of the upper members 43 of the carrier 5. In the illustrated article transfer arrangement 1, a "floating" section 75 is supported by vertical members 76 positioned in such a manner as to avoid interference with the rear member 45. The conveyor 52 may be a free, gravity conveyor or a live roller conveyor with drive means such as a sprocket and chain arrangement 77 operatively associated with the rollers 53.

By way of operation, the article carrier 5 approaches the loading station 3 with the front wheels 11 and 11' engaged with the lower track members respectively 9 and 9'. The front wheels are lifted about the sprockets 29 onto the upper track members 8 and 8' thereby effecting engagement of the carrier surface 15 with an article 16 which is supported on the loading platform 50. The article carrier 5 proceeds to the discharge station where the front wheels are lowered about the sprockets 28 thereby depositing the article onto the conveyor 52 for transfer elsewhere. The carrier 5 then returns to the loading station with rear wheels engaging the lower track members 9 and 9' and with the front end 14 of the carrier supported by the lower run 26 of the chain 6. If the weight of the unloaded carrier 5 is great enough, it would be desirable for the carrier to be returned to the loading station 3 with the front wheels 11 and 11' supported by the lower track members 9 and 9' to prevent stretching damaging loads on the chain and chain engaging structures.

The article transfer arrangement 1 may include control or signal means such as switches 78 adapted for operation by switch operators 79 located on the article carrier 5 for automatic control of the arrangement 1 or for sensing of the position of the carrier 5 on the track structure 2. While the article transfer arrangement 1 has been described in terms of the transfer of articles 16 from the loading station 3 to the discharge stations 4 (left to right as viewed in FIG. 2), the direction of transfer could be reversed without modification of the arrangement 1, such that articles 16 could be transferred from the conveyor 52 to the platform 50. Further, with appropriate modifications, the article transfer arrangement 1 could be constructed with the platform support surface 51 at a different level from the conveyor bed 54. The principal requirements for an inclined arrangement according to the present invention are horizontal station approach track sections 80 (see FIG. 2) and horizontal station approach chain segments 81. The approach sections 80 and segments 81 extend away from the respective stations and end turns 27 sufficient distances to insure that the carrier 5 and an article 16, possibly thereon, properly clear all members of the loading platform 50 and the discharge conveyor 52.

While certain forms of the present invention have been described and illustrated, it is not to be limited thereto except insofar as such limitations are included in the following claims.

What is claimed and desired to secure by Letters Patent is:

1. In an article transfer arrangement, the combination comprising:
  (a) a movable article carrier having first and second spaced apart ends;
  (b) a drive member arranged in an elongated endless loop having an upper run and a lower run and spaced apart end turns;
  (c) motor means operatively connected to said drive member and propelling same in said endless loop;
  (d) means connecting said drive member to said carrier to thereby move said first end about said loop by lifting said first end upon movement thereof about one of said end turns for effecting supporting engagement of said carrier with an article and for movement thereof toward the other of said end turns with said first end lifted during movement of said first end along said upper run; and to thereby lower said first end upon movement about the other of said end turns for disengagement of said carrier from said article and for return of said carrier toward said one end turn with said first end lowered; and
  (e) track means extending substantially parallel with said drive member and supporting said second end.

2. An arrangement as set forth in claim 1 wherein:
  (a) said arrangement includes a loading station spaced from a discharge station, said stations having respective horizontal article supporting platform surfaces;
  (b) said track means includes station approach track sections on opposite ends thereof, each of said sections extending horizontally beneath a respective platform surface, said platform surfaces having the same spacing above the respective approach section thereunder;

(c) said drive member includes horizontally extending station approach segments on said upper and lower runs adjacent said end turns;
(d) said carrier includes means defining an upper article engaging carrier surface;
(e) said second end includes wheel means spaced from said carrier surface; and
(f) said drive member is connected to said first end at a position which is spaced closer to said carrier surface than said wheel means, whereby said carrier surface is raised above the level of the platform surface of said loading station and is oriented horizontally to engage an article at said loading station upon said first end being lifted and whereby said carrier surface is lowered below the level of the platform surface of said discharge station to disengage said article upon said first end being lowered.

3. An arrangement as set forth in claim 1 wherein:
(a) said arrangement includes a loading station spaced from a discharge station, said stations having respective horizontal, substantially coplanar article supporting surfaces defining a platform level;
(b) said carrier includes means defining an upper article engaging carrier surface;
(c) said second end includes wheel means spaced from said carrier surface; and
(d) said drive member is connected to said first end at a position which is spaced closer to said carrier surface than said wheel means, whereby said carrier surface is raised above said platform level and is oriented horizontally to engage an article upon said first end being lifted at said loading station and whereby said carrier surface is lowered below said platform level to disengage said article upon said first end being lowered at said discharge station.

4. An arrangement as set forth in claim 1 wherein:
said drive member is an endless drive chain with said end turns engaging respective spaced apart sprockets.

5. An arrangement as set forth in claim 1 wherein:
(a) said drive member is an endless drive chain with said end turns engaging respective spaced apart sprockets; and
(b) said upper run is supported by an elongated chain support member having said upper run in sliding contact therewith to prevent said upper run from sagging.

6. An arrangement as set forth in claim 1 wherein:
(a) said carrier includes an upper article engaging carrier surface for engagement with an article when said carrier is adjacent one of said end turns and for disengagement from said article adjacent the other of said end turns; and
(b) said track means includes a track rail with ramp means at opposite ends thereof, said ramp means being angled with respect to said track rail and being engaged by said second end during engagement of said carrier surface with said article and disengagement therefrom to thereby orient said carrier surface horizontally during said engagement and disengagement thereof.

7. An arrangement as set forth in claim 1 wherein:
(a) said track means includes lower track means and upper track means extending parallel to said lower track means and spaced thereabove;
(b) said carrier includes first wheel means at said first end, said first wheel means engaging said upper track means for movement of said first end along said upper run and engaging said lower track means for return of said first end along said lower run; and
(c) said carrier includes second wheel means at said second end, said second wheel means engaging said lower track means at all times.

8. An arrangement as set forth in claim 7 wherein:
(a) each of said upper and lower track means includes a pair of laterally spaced parallel rails; and
(b) each of said first and second wheel means includes a pair of laterally spaced wheels respectively engaging said rails.

9. An arrangement as set forth in claim 7 including:
(a) a loading station spaced from a discharge station, said stations having respective horizontal platform surfaces for supporting an article;
(b) an upper carrier surface on said carrier for engaging said article and for supporting same during transfer between said stations; and
(c) leveling means on said track means for orienting said carrier surface horizontally during engagement thereof with said article at said loading station and during disengagement thereof from said article at said discharge station.

10. An arrangement as set forth in claim 1 including:
(a) a loading station and a discharge station positioned adjacent respective end turns of said drive member; and
(b) one of said stations being a conveyor.

11. An arrangement as set forth in claim 1 including:
(a) a loading station spaced from a discharge station; and
(b) said carrier is U-shaped in plan view to thereby clear portions of one of said stations during transfer of an article therebetween.

12. An arrangement as set forth in claim 1 wherein:
(a) said arrangement includes a loading station spaced from a discharge station, said stations including respective horizontal, substantially coplanar article supporting surfaces defining a platform level;
(b) said track means extend between said stations and include lower track means and upper track means spaced thereabove and extending parallel thereto, said upper track means being offset longitudinally with respect to said lower track means in the direction of said discharge station;
(c) said carrier includes means defining an upper article engaging carrier surface; and
(d) said carrier includes first and second wheel means respectively at said first and second ends, said first wheel means being spaced closer to said carrier surface than said second wheel means, whereby said carrier surface is oriented horizontally and raised into supporting contact with an article at said loading station and said first wheel means is lifted into engagement with said upper track means upon said first end being lifted about said one end turn and whereby said article engaging surface is lowered out of said supporting contact with said article at said discharge station and said first wheel means is lowered out of engagement with said upper track means upon said first end being lowered about said other end turn.

13. An arrangement as set forth in claim 1 including:
switch means positioned for operation by means on said carrier for sensing the position of said carrier.

14. An article transfer arrangement for transferring an article between a loading station and a discharge station comprising:
(a) a loading station spaced from a discharge station, said stations having respective horizontal, substantially coplanar article supporting surfaces defining a platform level;
(b) track means extending between said stations and including upper track means spaced above and parallel to lower track means;
(c) an article carrier including means defining an upper article supporting carrier surface;
(d) first and second wheel means at respective first and second ends of said carrier, said first wheel means being spaced closer to said carrier surface than said second wheel means, said second wheel means engaging said track means;
(e) looped endless drive chain means connected to said carrier adjacent said first end, said chain means including an upper run extending parallel to and spaced from said upper track means, a lower run extending parallel to and spaced from said lower track means, and spaced apart end turns engaging respective sprockets; and
(f) motor means drivingly connected to one of said sprockets to effect movement of said carrier between said stations by lifting said first wheel means into engagement with said upper track means thereby raising said carrier surface above said platform level and orienting said carrier surface horizontally to engage an article for movement thereof from said loading station to said discharge station during movement of said first end along said upper run and lowering said first wheel means out of engagement with said upper track means thereby lowering said carrier surface below said platform level to discharge said article at said discharge station and for return of said carrier to said loading station.

15. In an article transfer arrangement, the combination comprising:
(a) a movable article carrier having first and second spaced apart ends;
(b) a drive member arranged in an elongated endless loop having an upper run and a lower run and spaced apart end turns;
(c) motor means operatively connected to said drive member and propelling same in said endless loop;
(d) means connecting said drive member to said carrier to thereby lift said first end upon movement thereof about one of said end turns for movement of said first end along said upper run and to thereby lower said first end upon movement about the other of said end turns for return of said first end along said lower run; and
(e) elongated track means extending substantially parallel with said drive member and supporting said second end whereby said first end rotates about said second end,
(f) said track means including lower track means and upper track means extending parallel thereto and spaced thereabove;
(g) said carrier including first wheel means at said first end, said first wheel means engaging said upper track means for movement of said first end along said upper run and engaging said lower track means for return of said first end along said lower run;
(h) said carrier including second wheel means at said second end, said second wheel means engaging said lower track means at all times,
(i) a loading station spaced from a discharge station, said stations having respective horizontal platform surfaces for supporting an article;
(j) an upper carrier surface on said carrier for engaging said article and for supporting same during transfer between said stations;
(k) leveling means on said track means for orienting said carrier surface horizontally during engagement thereof with said article at said loading station and during disengagement thereof from said article at said discharge station,
(l) upper ramp means at opposite ends of said upper track means;
(m) lower ramp means at opposite ends of said lower track means; and
(n) at each of said stations, said upper ramp means being spaced from said lower ramp means a distance substantially equal to the spacing between said first and second wheel means and said ramp means being spatially related to a respective end turn of said drive member whereby said carrier surface is oriented horizontally by engagement of said first and second wheel means respectively with said upper and lower ramp means as engagement with said article by said carrier surface occurs at said loading station and as disengagement from said article occurs at said discharge station.

16. An arrangement as set forth in claim 15 wherein said upper and lower ramp means adjacent respective stations are angled in relation to respective upper and lower track means in a mutually parallel manner.

* * * * *